July 26, 1960 J. M. EASTMAN 2,946,188
ACCELERATION SCHEDULING AND ISOCHRONOUS GOVERNING FUEL
FEED AND POWER CONTROL DEVICE FOR GAS TURBINE ENGINES
Filed Dec. 9, 1954 2 Sheets-Sheet 1

INVENTOR.
JAMES M. EASTMAN
BY
ATTORNEY

July 26, 1960  J. M. EASTMAN  2,946,188
ACCELERATION SCHEDULING AND ISOCHRONOUS GOVERNING FUEL
FEED AND POWER CONTROL DEVICE FOR GAS TURBINE ENGINES
Filed Dec. 9, 1954  2 Sheets-Sheet 2

INVENTOR.
JAMES M. EASTMAN
BY
ATTORNEY.

United States Patent Office 2,946,188
Patented July 26, 1960

2,946,188

ACCELERATION SCHEDULING AND ISOCHRONOUS GOVERNING FUEL FEED AND POWER CONTROL DEVICE FOR GAS TURBINE ENGINES

James M. Eastman, South Bend, Ind., assignor to Bendix Aviation Corporation, South Bend, Ind., a corporation of Delaware Filed Dec. 9, 1954, Ser. No. 474,225

26 Claims. (Cl. 60—39.28)

The present invention relates to a fuel control device and more particularly to an acceleration scheduling and speed governing fuel control device for gas turbine engines.

One of the major problems in the design of fuel controls for gas turbine engines relates to the provision of good engine acceleration when the pilot demands more power, without exceeding certain engine limitations such as turbine inlet temperature, compressor stall, and rich flame-out. Steady state power is normally controlled by an engine speed governor which modulates fuel flow. When the pilot controlled throttle is moved to increase power, the governor increases fuel flow to a predetermined rich limit which is then varied as the engine speed increases to provide rapid engine acceleration without exceeding the aforesaid engine limitations. To provide this variation, the maximum fuel flow is normally scheduled as a function of such parameters as engine inlet pressure and temperature, engine speed, and/or compressor discharge pressure. This scheduling, however, can only approximate the maximum allowable engine acceleration rate, since such effects as variations in combustion or burner efficiency, fuel heating value and specific gravity, and Reynolds number, necessitate setting the fuel schedule much leaner than would otherwise be possible.

These effects can be avoided in the case of the turbine temperature limit by sensing this temperature and regulating fuel flow to maintain it at a safe value. However, no known presently existent fuel control has been developed which incorporates satisfactory means for sensing the imminence of compressor stall. The accelerating turbine temperature can be lowered on a scheduled basis to avoid compressor stall or rich flame-out. A problem connected with this, however, is that the lag or time constant associated with temperature sensing makes it difficult to avoid overshoot of actual turbine temperature on throttle bursts even though no indicated turbine temperature overshoot occurs. Further difficulties connected with a temperature scheduling control concern the short life of sensing elements, the varied temperature distribution radially and angularly about the engine, and the necessity for electrical amplification.

In view of the difficulties above outlined, engine acceleration rates are generally much lower than is theoretically possible, despite elaborate scheduling and regulating fuel control devices which have been developed. If the rate of acceleration is itself controlled according to a predetermined schedule, and held to said schedule by the sensing of the rate of acceleration and suitable concurrent regulation of fuel flow, even a liberal tolerance on scheduling and regulating accuracy would permit improved and faster engine acceleration than that provided by most current fuel control devices.

It has been found that in the region of compressor stall, a scheduled constant rate of engine acceleration, corrected only for compressor inlet pressure, closely approximates the stall limit. In the engine speed range above the compressor stall limit zone, a higher rate of acceleration than said constant rate would be permissible, but would only provide about one second or less reduction in total acceleration time. In view of this, and of the rich flame-out protection afforded by the lower acceleration rate, the present device is intended to schedule engine acceleration in the stall region and above, to equal a constant ($C_2$) times the absolute compressor inlet pressure ($P_r$).

On the other hand, in the engine speed range below the compressor stall region, acceleration rate is scheduled to approximate a desired constant turbine inlet temperature. It has been estimated that a constant turbine inlet temperature can be substantially maintained if the acceleration rate is scheduled to equal a constant ($C_1$) times the compressor pressure rise ($P_c - P_r$).

Furthermore, it has been found that stable isochronous governing at any given selected speed along a steady state schedule of operation, may be realized by utilizing an acceleration rate sense to anticipate the selected speed, thereby affording a proportional type governor cut-off slope from an under-selected speed point on the acceleration schedule to the selected speed point on the steady state schedule. By such an arrangement, stable isochronous governing may be realized without engine speed overshoot.

The fuel control device which is the subject of this invention is therefore designed to schedule rates of acceleration according to both of the aforementioned methods and to operate on that one which provides the lowest acceleration schedule. The provision of a fuel control device which will function as aforesaid constitutes one of the primary objects of this invention.

It is another object of this invention to provide means for regulating the rate of engine acceleration to correspond to scheduled values as high as will safely avoid exceeding the engine operating limits.

It is a further object of this invention to provide a method for accelerating a gas turbine engine at a substantially maximum allowable rate.

It is a still further object of this invention to provide means for regulating engine acceleration in accordance with a predetermined schedule thereof which is equal to a constant times the compressor pressure rise.

Yet another object of this invention is to provide means for regulating the rate of engine acceleration to correspond to a predetermined schedule which is equal to a constant times a pressure which varies with variations in ambient pressure.

Still another object of this invention is to utilize engine acceleration sensing means for providing isochronous governor anticipating action.

Additional objects and advantages of the invention will become apparent from the following description with reference to the accompanying drawings, wherein.

Figure 1:
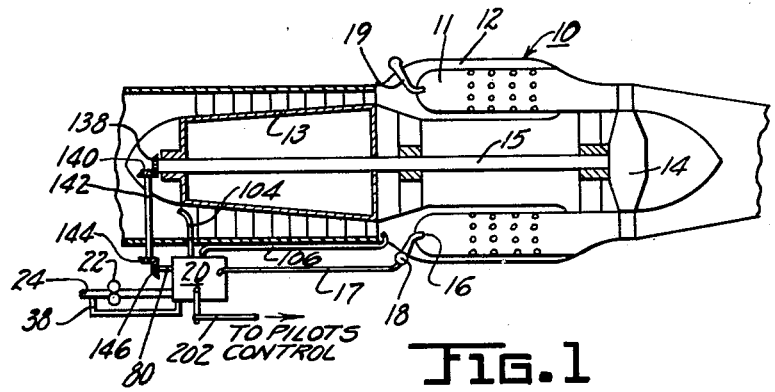
Figure 1 is a sectional view of a turbo-jet engine equipped with a fuel feed and power control device in accordance with the invention.
Figure 3:
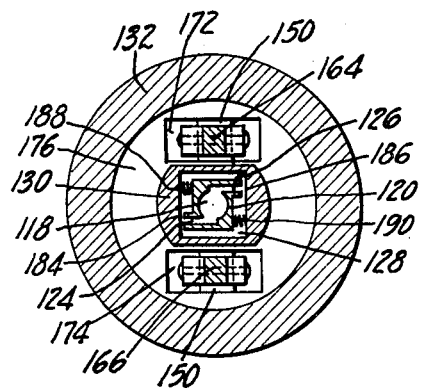
Figure 3 is a sectional view taken on section 3—3 of Figure 2.
Figure 2:
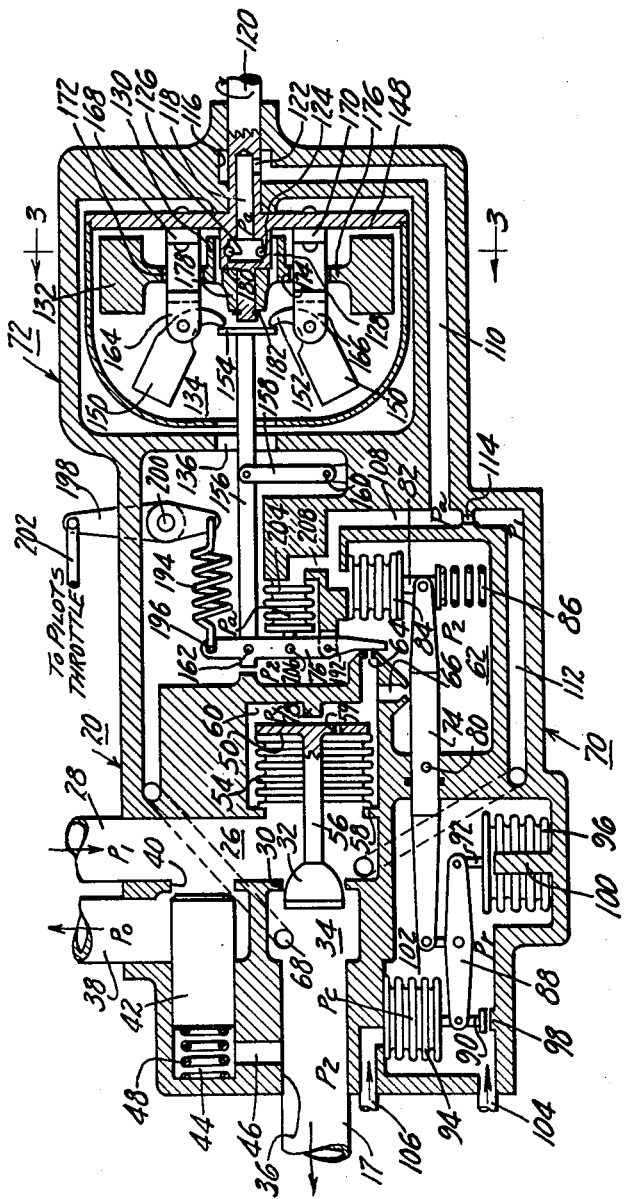
Figure 2 is a schematized sectional view of the fuel control device which is used on the engine of Figure 1.

Referring now to Figure 1, a gas turbine engine is generally indicated at 10, and includes a series of combustion chambers 11, mounted in a casing having a header or air intake section 12, a dynamic compressor 13, which is shown as of the axial flow type, and a turbine 14 for driving said compressor through a shaft 15. Each of the combustion chambers is provided with a burner nozzle 16, to which metered fuel is supplied under pressure by way of a conduit 17, a fuel manifold 18 and individual fuel lines 19. The conduit 17 receives metered fuel from a fuel control device generally indicated at 20 in Figure 1 and shown primarily in sectional schematic in Figures 2 and 3, which will now be described.

A pressurizing pump 22, shown as of the positive displacement type, receives fuel from a source of supply, not shown, through an inlet conduit 24 (see Figure 1) and supplies fuel to a chamber 26 of fuel control 20 at pressure $P_1$ through a conduit 28. A portion of this fuel is then metered at an orifice 30 by a contoured metering valve 32 and thence flows to the burners 11 at fuel pressure $P_2$ by way of a chamber 34, a conduit 36, conduit 17, manifold 18, and burner nozzle 16. The rest of the fuel flowing into chamber 26 is by-passed back to pump inlet conduit 24 by way of a conduit 38, which is connected to chamber 26 by an opening 40; the area of opening 40 may be varied by a pressure head regulator valve 42. A chamber 44, in which valve 42 may reciprocate, is connected to conduit 36 by a passage 46 and contains a spring 48 which abuts the left end of valve 42, whereby said valve by-passes fuel from chamber 26 to the pump inlet to maintain a substantially constant pressure drop across metering valve 32 under all conditions of engine operation, the value of said pressure drop being a function of the load of spring 48. The pressure drop may be controlled to a more nearly constant value by utilizing a regulator valve of the type disclosed and claimed in copending application Serial No. 684,368 which is a continuation of the now abandoned application Serial No. 248,402, filed September 26, 1951 in the name of Harry C. Zeisloft (common assignee).

The metering valve 32 is of the single poppet type and is connected to a closed end 50 of a bellows 54 by a rod 56. The open end of the bellows is anchored to an annular part 58 of the housing so that the bellows forms an expansible and contractible extension of a chamber 26, and the closed end of the bellows contains a calibrated restriction 59 therein. The control housing forms a valve control pressure chamber 60. Fuel flows from chamber 26 at pressure $P_1$ through restriction 59 to chamber 60 at pressure $P_x$, and from there into a housing chamber 62 at pressure $P_2$ through either or both of orifices 64 or 66, and thence to metered fuel chamber 34 by way of a passage 68. The arrangement is such that variation of the ratio of the area of orifices 64 and 66 to the area of the fixed calibrated restriction 59 varies the intermediate pressure $P_x$. The pressure drop across metering valve 32 ($P_1-P_2$) tends to drive said valve in an opening direction, but is opposed by the pressure drop across restriction 59 ($P_1-P_x$) in the bellows closed end 50, said bellows end having a cross-sectional area approximately equal to twice the area of valve 32, as shown, so that the fuel valve is in force equilibrium whenever the pressure difference $P_1-P_x$ is approximately half the pressure difference $P_1-P_2$. As $P_x$ approaches $P_1$ valve 32 moves in an opening direction, and as it approaches $P_2$ the valve moves in a closing direction. The position of metering valve 32 is therefore always determined by the pressure $P_x$, which is controlled in a manner to be described.

A fuel control portion which is designed to schedule a desired rate of engine acceleration at any given altitude is generally indicated at 70, and another control portion which is designed to function as an engine isochronous governor and to generate a pressure drop ($P_a-P_2$) which is directly proportional to the rate of engine acceleration is generally indicated at 72.

Acceleration scheduling control 70 is constructed to control the position of a servo type flapper valve 74 with respect to orifice 66, and governor control 72 is constructed to control the position of a servo type flapper valve 76 with respect to orifice 64. The effective area of orifices 64 and 66, as controlled by valves 76 and 74 respectively, determines the position of metering valve 32 by affecting the control pressure $P_x$. Valve 76 tends to control pressure $P_x$, and therefore the engine, during governor operation, for which condition valve 74 is closed, and valve 74 tends to control pressure $P_x$, and therefore, the engine during acceleration, during which valve 76 is closed. During deceleration valve 76 is wide open and metering valve 32 moves to a minimum flow position as determined by a stop 78, at which position fuel is metered at a constant minimum rate.

The flapper valve 74 is fulcrumed at 80 and is connected at the right end thereof to an extension 82 of a pressure responsive bellows 84 which is opposed by a spring 86, and is connected at the left end thereof to a floating lever 88, said lever being attached to extensions 90 and 92 of bellows 94 and 96, respectively. A pair of stops 98 and 100 limit the downward movement of bellows 94 and 96, respectively, said bellows being anchored to the housing and mounted in a chamber 102 which is connected to the inlet section of the compressor by a conduit 104. The bellows 94 is interiorly connected to the discharge end of compressor 13 by a conduit 106, and the bellows 96 is evacuated. The bellows 94 therefore develops a downward force which is proportional to compressor pressure rise ($P_c-P_r$), whereas the bellows 96 develops a downward force which is proportional to the absolute compressor inlet pressure ($P_r$). It is therefore apparent that that bellows which develops the greatest downward force will move against its stop, thereby overpowering the other bellows and tilting valve 74 about its fulcrum 80. The downward force on the left end of valve 74 will then be proportional to the lesser of the two bellows forces. This downward force is the acceleration scheduling force, and will equal either a constant times compressor pressure rise [$C_1 \cdot (P_c-P_r)$], or a different constant times absolute compressor [$C_2 \cdot P_r$], whichever is the lesser. During an acceleration of the engine, therefore, one or the other of the bellows will be in contact with its respective stop, and that bellows not against its stop develops a downward force about fulcrum 80 which tends to move flapper valve 74 in a closing direction with respect to orifice 66.

The bellows 84 is interiorly connected by a passage 108 to a conduit 110, which is connected to $P_1$ pressure chamber 26 by a passage 112 and a calibrated restriction 114, and to $P_2$ pressure chamber 34 by way of a chamber 116 formed in the control housing, a passage 118 formed within an engine driven drive shaft 120 and opening into chamber 116 at 122, servo valve restrictions 124 and 126 formed on opposite sides of said drive shaft and connecting passage 118 to a chamber 128 formed within a hub section 130 of a fly-wheel 132, a chamber 134, an opening 136, chamber 62 and passage 68. It is apparent that the pressure designated as $P_a$, to which bellows 84 is interiorly vented, will vary as a function of the area relationship between fixed restriction 114 and variable restriction 124 and 126, and will always be intermediate the pressures $P_1$ and $P_2$.

Drive shaft 120 is connected to be driven by engine drive shaft 15 by means of bevel gears 138 and 140, shaft 142, bevel gears 144 and 146 and shaft 80 (Figure 1). A mounting plate 148 is formed integral with shaft 120 and pivotally mounts a pair of centrifugal governor weights 150 on bifurcated bracket members 164 and 166, which are rigidly connected to the mounting plate at 168 and 170, respectively. The governor weights have foot extensions 152 which are adapted to abut a flanged end 154 of a rod 156 held in position by a link 158 pivoted at 160 and connected to flapper valve 76 at pivot 162. Brackets 164 and 166 pass through openings 172 and 174, which are formed in a web 176 of flywheel 132.

The flywheel 132 is journalled on drive shaft 120 at 178 and is held in a fixed axial position on said shaft between a shaft hub 180 and a lock ring stop 182, said flywheel and journal being free to rotate relative to the shaft. The mechanism is such that flywheel motion relative to the shaft is constrained to small oscillation amplitudes, and the flywheel tends to have a fixed position relative to said shaft. Valve seats 184 and 186 are formed on inner opposing surfaces of flywheel hub 130, and equal rate springs 188 and 190 abut said hub surfaces and the drive shaft on opposite sides thereof to produce a force couple on the flywheel which urges said flywheel in a counterclockwise or valve closing direction relative to shaft 120. The force couple which is produced by springs 188 and 190 on the flywheel is opposed by a second force couple which results from the application of fuel at pressure $P_a$ against valve seats 184 and 186, which latter force couple tends to drive the flywheel in a clockwise direction relative to shaft 120. The intermediate pressure $P_a$ between restriction 114 and valves 124 and 126 is determined by the effective area of said valves, and varies between pressure $P_1$ when said valves are closed and essentially pressure $P_2$ when the valves are wide open.

At steady engine operational speeds, the flywheel 132 tends to position itself so that the counterclockwise torque resulting from springs 188 and 190 balances the clockwise torque resulting from the application of pressure $P_a$ at valve seats 184 and 186. Whenever the spring torque exceeds the pressure torque, the flywheel moves slightly counterclockwise causing the valves to close and the pressure $P_a$ to increase until the pressure torque balances the spring torque. It can therefore be seen that the pressure differential $P_a-P_2$ is regulated to measure the load of springs 188 and 190.

During an acceleration of the engine, the inertia of the flywheel will cause it to close valves 124 and 126 against the respective valve seats, thereby raising the pressure differential $P_a-P_2$ until the pressure torque generated at the valves balances out the torque produced by springs 188 and 190 plus the torque necessary to accelerate the flywheel at the rate of acceleration of shaft 120. Similarly, if the engine decelerates, the flywheel inertia will cause the valves 124 and 126 to open until the pressure drop $P_a-P_2$ generates a torque equal to the spring torque minus the torque necessary to decelerate the flywheel with the shaft. Thus, the pressure difference $P_a-P_2$ varies from an intermediate constant steady state value by amounts proportional to the rate of engine acceleration or deceleration. The pairing of valves 124 and 126 and of springs 188 and 190 provides flywheel driving torque in the form of a couple so that the flpwheel support journal bearing 178 is relieved of loads associated with the driving torque, thereby minimizing frictional errors which would otherwise result. The bellows 84 is responsive to the acceleration signal pressure difference $(P_a-P_2)$ and the spring 86 is selected so as to balance the force output of bellows 84 when $P_a-P_2$ is at its equilibrium steady state value. Thus the net downward force output of bellows 84 and spring 86, as applied to the right end of flapper valve 74, is proportional to the departure of the acceleration signal pressure difference $P_a-P_2$ from its preselected steady state value, and hence is proportional to the rate of engine acceleration.

Since the downward force on the left end of flapper valve 74 equals a constant times compressor pressure rise $[C_1(P_c-P_r)]$ or a different constant times compressor inlet pressure $[C_2P_r]$, it is apparent that orifice 66 will be held closed except when the downward force proportional to the rate of engine acceleration equals or exceeds this force. It is also apparent that opening of orifice 66, by lowering the pressure $P_x$, causes valve 32 to close and reduce the engine fuel supply, thereby decreasing the rate of engine acceleration. Thus flapper valve lever 74 acts when needed to limit and regulate the engine acceleration rate according to the desired schedule.

The centrifugal weights 150 generate a force output which varies with engine speed and which is applied to the engine speed governor servo valve 76 through rod 156 at pivot 162, said valve being fulcrumed at 192, and said weight force output being opposed by a governor tension spring 194 connected to said valve at 196 and to a lever 198 fulcrumed at 200, which is connected to a pilot's throttle lever, not shown, by a link rod 202. A bellows 204 is mounted in chamber 62 and is connected to valve 76 at 206, said bellows being interiorly vented to pressure $P_a$ by way of a passage 208. Thus, bellows 204 responds to the acceleration signal pressure difference $P_a-P_2$ to impose a force on valve 76 for a purpose to be described. Pilot's lever 198 via link rod 202 may be actuated to variably tension governor spring 194 which selects any desired speed of engine operation within a predetermined range. During equilibrium operation of the engine at a selected speed, the moment of the force output of centrifugal weights 150 about fulcrum 192 plus the moment of force output of bellows 204 about said fulcrum, balances the moment force of spring 194, thereby controlling the effective area of orifice 64 such that pressure $P_x$ is controlled to maintain metering valve 32 in such a position that fuel flow to the engine maintains selected speed. During such operation, valve 74 closes orifice 66.

*Operation*

Figure 4:
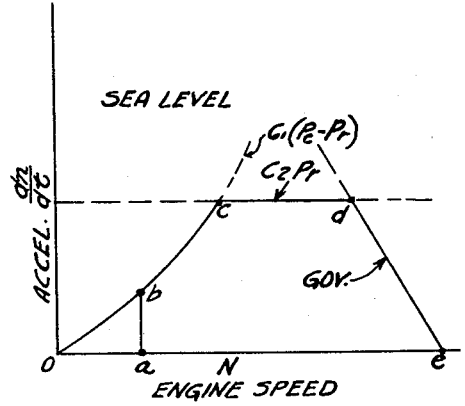
Figure 4 is a qualitative curve chart which illustrates certain operating characteristics of the fuel control device shown in Figures 2 and 3.

Referring now to Figure 4, a curve is shown plotted on coordinates of rate of change of engine speed or acceleration $$\frac{(dN)}{(dt)}$$

versus engine speed (N), and illustrates the operating characteristics of a gas turbine engine when controlled by a device of the type herein described Points *a* and *e* illustrate conditions of steady state operation of the engine at different selected speeds; i.e. at conditions of zero acceleration. Curve *abcde* represents a complete engine acceleration from zero to maximum speed, as scheduled by my device: Curve portion *obc* represents that part of the acceleration schedule in which the rate of engine acceleration is controlled to vary in proportion to compressor rise $(P_c-P_r)$; curve portion *cd* represents another part of the acceleration schedule in which the rate of engine acceleration is controlled in proportion to compressor inlet or ram pressure $(P_r)$; and curve portion *de* represents the final part of the acceleration schedule in which the rate of engine acceleration is decreased to zero by the applicant's governing mechanism.

Assuming that the engine has been started and accelerated to idle speed, as represented by point *a*, the force output of the centrifugal weights 150 plus the constant force output of bellows 204 (at zero acceleration) is opposed by the force output of governor spring 194, and the sum of the moments of these three forces about fulcrum 192 is in equilibrium, whereby the area of orifice 64 is controlled by valve 76 such that pressure $P_x$ in chamber 60 controls the position of metering valve 32, and therefore fuel flow, to maintain the selected engine operating speed. During such equilibrium operation, the force output of bellows 84 is equal to the loading of spring 86, and the downward forces imposed on acceleration scheduling bellows 94 and 96 holds valve 74 closed.

So long as the net acceleration force output of bellows 84 and spring 86 is less than the scheduling force on the left end of valve 74, said valve will remain closed, and metering valve 32 will be under the control of valve 76. However, whenever this acceleration force balances the force on the left end of valve 74, said valve is actuated to control pressure $P_x$ and to move valve 32 as necessary to regulate and limit the engine acceleration rate to values which will hold the acceleration force output of bellows 84 essentially in balance with the scheduling force applied to the left end of said valve. Valve 74 only takes over control from valve 76, when the latter valve has moved closed in response to a pilot demand for more engine speed, as evidenced by an increased tension load on spring 194. Valve 74 will then tend to regulate the area of orifice 66 such that the main fuel valve 32 is varied in position to provide the scheduled rate of engine acceleration. It can be seen that engine acceleration in excess of the scheduled value will tend to increase the opening of valve 74 from its equilibrium position by an amount proportional to the acceleration error, and that this will cause valve 32 to move closed at a rate proportional to said acceleration error.

It is apparent from the foregoing, that the maximum engine acceleration rate is limited to a proportional relation with the acceleration scheduling force, which results in engine acceleration as indicated by the solid line $abcd$ at any given altitude; i.e. maximum engine acceleration will be proportional to $C_1(P_c-P_r)$ or to $C_2 \cdot P_r$, whichever is the smaller.

To be more explicit, if the pilot should suddenly increase the speed setting from point $a$ to point $e$ by rotating lever 198 counterclockwise, the following sequence of operations will occur: (1) the setting of spring 194 will instantaneously demand an acceleration much greater than is allowed by either of acceleration scheduling bellows 94 or 96, i.e. approximately as would be indicated by the point of intersection between lines $ab$ and $de$, and pressure $P_x$ in chamber 60 immediately increases to open valve 32, thereby increasing the supply of fuel to the engine; (2) the increase in fuel flow would produce an instantaneous acceleration at speed $a$, as indicated by line $ab$, resulting in counterclockwise movement of flywheel 132 relative to drive shaft 120, thereby decreasing the area of valves 124 and 126 and increasing acceleration signal pressure difference $P_a-P_2$, which increase results in a downward movement of bellows 84 to open valve 74 and limit engine acceleration to point $b$, as scheduled by bellows 94 at the then existing speed; (3) between points $b$ and $c$, pressure $P_r$ holds bellows 96 against its stop 100 and acceleration is scheduled by the downward force resulting from the application of compressor rise acting on bellows 94 and valve 74, during which time the acceleration signal producing mechanism, best shown in Figure 3, generates a balancing net force across bellows 84 and spring 86 such that the rate of opening of valve 32 is varied as needed to schedule the engine acceleration in proportion with compressor pressure rise; (4) just beyond point $c$ along curve $bc$, the compressor pressure rise scheduling force becomes greater than the ram pressure scheduling force, and bellows 94 contacts its stop 98 forcing bellows 96 off stop 100, whereby acceleration scheduling becomes proportional to absolute compressor inlet or ram pressure, and the engine continues to accelerate along curve $cd$ at a constant rate as the force output of bellows 84 follows that of bellows 96; (5) as the engine speed approaches that selected by the pilot, the higher than equilibrium value of $P_a-P_2$ acts on bellows 204 and causes valve 76 to reach torque balance at an engine speed $d$ which is lower than that selected by the pilot; (6) valve 76 then opens and causes metering valve 32 to close, which results in a reduced acceleration rate, thereby reducing acceleration signal pressure $P_a-P_2$ below that scheduled by bellows 96, following which valve 74 closes orifice 66; and (7) the resulting decreasing acceleration along curve $de$ tends to keep valve 76 in equilibrium because of the reducing force output of bellows 204 and the increasing force output of flyweights 150, such that as the engine continues to accelerate at progressively lower rates, valve 76 operates to maintain balance between the torque produced by governor spring 194 and the sum of the torques produced by weights 150 and bellows 204; thus, as the acceleration rate decreases, speed increases until equilibrium is reached at selected speed $e$, with $P_a-P_2$ at its equilibrium value. It is apparent that the acceleration sensing provided by bellows 204 provides phase lead, tending to eliminate engine speed overshoot on throttle bursts, and permit high governor response speed without instability.

From the above it is apparent that the present device provides three mutually overriding acceleration control means so constructed and arranged with respect to each other that the engine accelerates on that schedule which demands the least acceleration rate.

If the pilot actuates lever 198 clockwise to decelerate the engine, the sum of the torques of centrifugal weights 150 and bellows 204 acting on valve 76 actuates said valve to a wide open position, which allows valve 32 to move against its minimum flow stop 78; a constant minimum flow to the engine is therefore maintained until such time as the lower than equilibrium acceleration pressure signal $P_a-P_2$ anticipates the lower selected speed and permits the governor to actuate valve 76 in a closing direction until governor equilibrium is again attained at the new selected speed. Obviously, acceleration valve 74 is closed throughout a deceleration of the engine since valve 76 is open and the acceleration pressure signal is much lower than that required to balance the acceleration force scheduled by bellows 96.

Although I have shown and decribed only one embodiment of my invention, it will be apparent to those skilled in the art that numerous modifications in the form and relative arrangement of parts may be made without departing from the scope thereof. For simplicity, the chosen acceleration scheduling method, hereinbefore described, represents some compromise of engine acceleration potential. For reasons hereinbefore stated, this compromise still permits engine acceleration which is comparable or better than that offered by current fuel control types. It is important to note that, at the expense of some increase in complexity, the acceleration scheduling may be made more nearly optimum. For instance, an air computing device, such as is disclosued and claimed in the copending application Serial No. 401,989, filed January 4, 1954, in the name of Daniel G. Russ (common assignee), may be utilized to develop a reference pressure in chamber 102 which is proportional to compressor inlet pressure times any desired function of compressor pressure ratio, in which instance an evacuated or selected compressor pressure sensing bellows could be directly connected to the left end of valve 74 in place of the two bellows and connecting lever of the described embodiment, and the computed air pressure vented to chamber 102. Such an arrangement would schedule a more nearly optimum acceleration rate throughout the speed range of the engine. Furthermore, if chamber 102 were vented to ambient pressure rather than to compressor inlet pressure, in the device as described, higher engine accelerations would be permitted at high ram ratios.

I claim:

1. A fuel feed and power control device for a gas turbine engine having a burner and a compressor, comprising first means for controlling the quantity of fuel flowing to the burner, second means operatively connected to said first means and responsive to an engine operating condition for scheduling a uniform engine acceleration rate, and third means operatively connected to said first and second means for generating a fluid pressure signal which is proportional to said acceleration rate for controlling said first means.

2. A fuel feed and power control device as claimed in claim 1 wherein said first means comprises a fuel valve and orifice, and said second and third means control the position of said valve with respect to said orifice.

3. A fuel feed and power control device as claimed in claim 1 wherein said second means includes a device responsive to compressor discharge pressure.

4. A fuel feed and power control device as claimed in claim 1 wherein said second means includes a device responsive to compressor pressure rise.

5. A fuel feed and power control device as claimed in claim 1 wherein said second means includes a device responsive to compressor inlet pressure.

6. A fuel feed and power control device as claimed in claim 1 wherein said second means includes a device responsive to an air pressure which varies with variations in ambient pressure.

7. A fuel feed and power control device as claimed in claim 1 wherein said second means includes a first member for producing a force which varies with variations in engine speed, a second member for producing a force which varies with variations in ambient pressure, and means interconnecting said first and second members in such a manner that that member which produces the least force schedules the engine acceleration rate.

8. A fuel feed and power control device as claimed in claim 1 wherein said third means includes engine driven rotatable valve means, and a conduit conducting pressurized fluid to said valve means, said latter valve means being constructed and arranged to control the effective fluid pressure level of said pressurized fluid whereby fluid pressure signal is generated.

9. A fuel feed and power control device as claimed in claim 4 wherein the fluid pressure signal which is generated by said third means is proportional to the force produced by said compressor pressure rise responsive device during an acceleration of the engine.

10. A fuel feed and power control device as claimed in claim 5 wherein the fluid pressure signal which is generated by said third means is proportional to the force produced by said compressor inlet pressure responsive device during an acceleration of the engine.

11. A fuel feed and power control device as claimed in claim 7 wherein said fluid pressure signal generated by said third means is proportional to the lesser of the forces produced by said first and second members during acceleration of the engine.

12. A fuel feed and power control device as claimed in claim 1 plus engine speed governing means operatively connected to said first means and including means responsive to the acceleration fluid pressure signal which is generated by said third means for anticipating the engine speed setting of said governor during an acceleration of the enigne.

13. A fuel feed and power control device for a gas turbine engine having a burner and a compressor, comprising a fuel conduit for conducting fuel to a burner, valve means for controlling the flow of fuel through said conduit, and means operatively connected to said valve means for controlling the fuel flow therethrough in accordance with a predetermined schedule of engine acceleration rate including a valve controlling member, a first means responsive to an engine operating condition related to power output for applying a force to said member which varies with variations in said condition, and second means responsive to a second engine operating condition related to power output for applying a counteracting force to said member which follows variations in the force applied by said first means, said second means including an engine driven member having a flow restriction formed therein, a fluid passage for conducting fluid under pressure to said restriction, an inertia member mounted on said engine driven member and rotatable relative thereto during an acceleration of the engine, and valvular means formed integral with said inertia member for varying the effective area of said restriction during said relative rotation in such a manner that fluid pressure in said passage varies with variations in said second engine operating condition.

14. A fuel feed and power control device for gas turbine engines as claimed in claim 13 wherein the engine operating condition to which said first means responds is compressor rise and said second engine operating condition is engine acceleration.

15. A fuel feed and power control device for gas turbine engines as claimed in claim 19 wherein the engine operating condition to which said first means responds is compressor rise within a first predetermined range of engine speed and is compressor inlet pressure within a second predetermined range of engine speed, and said second engine operating condition is engine acceleration.

16. A fuel feed and power control device as claimed in claim 13 wherein an expansible fluid pressure chamber is formed on one side of said valve means for controlling the position thereof, and said valve controlling member comprises a servo valve for controlling the pressure level in said chamber.

17. A fuel feed and power control device for a gas turbine engine having a burner and a compressor, comprising first means for controlling the quantity of fuel flowing to the burner, second means operatively connected to said first means and responsive to the rise in pressure across the compressor for scheduling an engine acceleration rate, and third means operatively connected to said first and second means for generating an engine acceleration responsive signal which is proportional to said scheduled acceleration rate for controlling said first means.

18. A fuel feed and power control device as claimed in claim 17 wherein a member for controlling said first means interconnects said second and third means, said second means being adapted to apply a torque to said member which varies with variations in compressor rise, and said third means being adapted to apply a counteracting torque to said member which varies in proportion to variations in the rate of engine acceleration.

19. A fuel feed and power control device for a gas turbine engine having a burner and a compressor, comprising first means for controlling the quantity of fuel flowing to the burner, second means operatively connected to said first means and responsive to a compressor generated pressure for scheduling an engine acceleration rate, and third means operatively connected to said first and second means for generating an engine acceleration responsive signal which is proportional to said scheduled acceleration rate for controlling said first means.

20. A fuel feed and power control device as claimed in claim 19 wherein a member interconnects said second and third means and is adapted to control said first means, said second means being adapted to apply a torque to said member which varies with variations in said compressor generated pressure, and said third means being adapted to apply a counter torque to said member which varies with variations in engine acceleration rate.

21. A fuel feed and power control device for a gas turbine engine having a burner, comprising a fuel conduit for conducting fuel to the burner, valve means for controlling the flow of fuel through said conduit, pilot controlled means operatively connected to said valve means for controlling the flow regulating position thereof and for selecting steady state engine speeds, governor means operatively connected to said valve means and to said pilot controlled means for maintaining the selected speed irrespective of variations in engine operating conditions, and acceleration control means also operatively connected to said valve means including means responsive to an engine operating condition related to power output for scheduling a predetermined engine acceleration rate and means for generating a fluid pressure signal which varies in proportion to engine acceleration rate.

22. A fuel feed and power control device as claimed in claim 21 wherein said fluid pressure signal generating means includes an engine driven valvular means for generating a fluid pressure difference which varies as a function of the rate of engine acceleration, and means responsive to said fluid pressure difference for varying the position of said valve means as a function of the acceleration rate.

23. A fuel feed and power control device as claimed in claim 22 wherein said fluid pressure signal generating means includes an engine driven member having a flow restriction formed therein, a fluid passage for conducting fluid under pressure to said restriction, an inertia member mounted on said engine driven member and rotatable relative thereto during an acceleration of the engine, and valvular means formed integral with said inertia member for varying the effective area of said restriction during such relative rotation in such a manner that the fluid pressure in said passage, in varying with engine acceleration rate, varies with variations in said engine operating condition.

24. A fuel feed and power control device as claimed in claim 21 wherein the engine operating condition to which said acceleration control means responds is compressor pressure rise.

25. A fuel feed and power control device as claimed in claim 21 wherein the engine operating condition to which said acceleration control means responds is a pressure which varies with variations in altitude.

26. A fuel feed and power control device as claimed in claim 21 wherein said governor means includes a member responsive to said fluid pressure acceleration signal for causing governor cut-off action to begin during an acceleration of the engine at a speed lower than that selected by the pilot.

References Cited in the file of this patent

UNITED STATES PATENTS

| | | |
|---|---|---|
| 2,557,526 | Bobier et al. | June 19, 1951 |
| 2,573,724 | Neal | Nov. 6, 1951 |
| 2,633,830 | McCourty et al. | Apr. 7, 1953 |
| 2,643,513 | Lee | June 30, 1953 |
| 2,675,674 | Lee | Apr. 20, 1954 |
| 2,691,268 | Prentiss | Oct. 12, 1954 |
| 2,693,081 | Russ | Nov. 2, 1954 |
| 2,702,560 | Bobier | Feb. 22, 1955 |
| 2,714,803 | Abild | Aug. 9, 1955 |
| 2,737,015 | Wright | Mar. 6, 1956 |

FOREIGN PATENTS

| | | |
|---|---|---|
| 700,776 | Great Britain | Dec. 9, 1953 |
| 712,646 | Great Britain | July 28, 1954 |